US005609714A

United States Patent [19]

Whiteside et al.

[11] Patent Number: 5,609,714

[45] Date of Patent: Mar. 11, 1997

[54] APPARATUS FOR DRY PROCESSING OF OPTICAL PRINT MEDIA

[75] Inventors: George D. Whiteside, Lexington; Richard A. Rosenthal, Winchester; Margaret A. Obermiller, Wayland, all of Mass.

[73] Assignee: Sterling Dry Imaging, Inc., Glasgow, Del.

[21] Appl. No.: 341,527

[22] Filed: Nov. 17, 1994

Related U.S. Application Data

[63] Continuation-in-part of Ser. No. 240,459, May 10, 1994.

[51] Int. Cl.$^{6}$ .................................................... B32B 31/00

[52] U.S. Cl. .......................... 156/387; 156/540; 156/555; 156/583.1; 156/584

[58] Field of Search .................................... 156/384, 387, 156/555, 583.1, 584, 538, 539, 540, 580, 581, 582

[56] References Cited

U.S. PATENT DOCUMENTS

| | | | |
|---|---|---|---|
| 1,007,008 | 10/1911 | Roesen | 271/9.02 |
| 1,078,963 | 11/1913 | Sheldon | 271/9.11 |
| 3,072,397 | 1/1963 | Kelchner | 271/53 |
| 4,484,734 | 11/1984 | Tsudaka et al. | 271/9 |
| 4,775,438 | 10/1988 | Funakoshi et al. | 156/241 |
| 5,072,925 | 12/1991 | Thiel | 271/227 |
| 5,078,384 | 1/1992 | Moore | 271/228 |
| 5,141,584 | 8/1992 | Schuh et al. | 156/344 |
| 5,158,279 | 10/1992 | Laffey et al. | 271/272 |
| 5,159,352 | 10/1992 | Ferla et al. | 346/108 |
| 5,160,399 | 11/1992 | Ueda et al. | 156/359 |
| 5,161,794 | 11/1992 | Adachi | 271/272 |
| 5,169,140 | 12/1992 | Wenthe, Jr. | 271/228 |
| 5,169,475 | 12/1992 | Tobin | 156/344 |
| 5,169,476 | 12/1992 | Silveira | 156/344 |
| 5,431,384 | 7/1995 | Obermiller et al. | 271/11 |

FOREIGN PATENT DOCUMENTS

| | | |
|---|---|---|
| 63-82255 | 4/1988 | Japan . |
| 218244 | 1/1990 | Japan . |
| 398940 | 4/1991 | Japan . |
| 3128842 | 5/1991 | Japan . |
| 3195662 | 8/1991 | Japan . |
| 3267244 | 11/1991 | Japan . |
| 4133943 | 5/1992 | Japan . |
| 4173643 | 6/1992 | Japan . |
| 4323134 | 11/1992 | Japan . |

*Primary Examiner*—James Sells

[57] ABSTRACT

A system for sheetwise dry processing thermographic print media is disclosed. The media is a laminate of a substrate with an attached frangible tab, a peel sheet and an adhesive image forming layer. A feeder feeds the sheets one at a time from a first position and orientation to a second position and orientation with the tab at a trailing end. A print roller is mounted for reversible rotation in infeed and outfeed directions. The print roller has clamps for engaging the sheet as received from the sheet feeder. A thermal printer cooperates with the print roller for thermally exposing the substrate. A peeler receives the sheet from the print roller with the tab at the leading edge. The peeler captures the film and engages the tab bending the substrate about the score line causing it to fracture. The peeler pulls the substrate and adhered image layer apart from peeler sheet to thereby produce a peeled substrate with an image layer and a waste peeler sheet. A thermal laminator receives the substrate and image layer for thermal laminating engagement with a thermosensitive film having a thermosensitive layer transferrable to the image layer of the substrate. The film is thereafter stripped from the structure and the substrate transferred to a discharge receptacle.

9 Claims, 7 Drawing Sheets

APPARATUS FOR DRY PROCESSING OF OPTICAL PRINT MEDIA

CROSS-REFERENCE TO RELATED APPLICATIONS

The present application is a continuation-in-part of U.S. patent application Ser. No. 08/240,459 filed May 10, 1994; and is related to U.S. patent application Ser. No. 08/240,460 filed May 10, 1994 by J. Morse abandoned; U.S. patent application Ser. No. 08/240,245 filed on May 10, 1994 by M. Obermiller et al U.S. Pat. No. 5,431,384; U.S. patent application Ser. No. 08/240,854 filed on May 10, 1994 by M. Gove et al.; U.S. patent application Ser. No. 08/241,149 filed May 10, 1994 by D. Van Allen et al U.S. Pat. No. 5,520,776; and, U.S. patent application Ser. No. 08/241,148 filed May 10, 1994 by G. Whiteside et al U.S. Pat. No. 5,516,096.

BACKGROUND OF THE INVENTION

The invention pertains to an apparatus for dry processing optical media, in particular, the apparatus is directed to an apparatus for dry processing thermographic print media formed of a substrate, an overlying laminated disposable peel sheet, and an intermediate multicomponent image layer of image forming materials and thermally sensitive adhesives joining the substrate and peel sheet. The print media is supplied from a feeder to an optical drum printer for thermal printing an image on the image layer adhered to the substrate; then to a peeler which separates the disposable peel sheet from the substrate; then to a laminator for protecting the print media image formed on the substrate; and finally to a discharge.

There are a number of systems available for dry processing thermographic print media. Such systems typically employ supply sheets of print media, one at a time, to an optical drum printer which employs a helical scanning laser to expose the media. The thus exposed media is then transferred to a peeler or delaminator which separates the exposed media from a disposable peel sheet and then sometimes to a laminating device which forms a protective coating on the exposed media.

While the general process is known (e.g., feeding, exposing, peeling and laminating), the various systems currently available, require improvement. For example, some systems are complex and while effective, may not be as efficient as desirable.

It has also been noticed that a variety of options are available for supplying, transporting and processing the thermographic media, some of which options appear to be more readily facilitated than others. The options include positionment of the various elements, including the feeder, the printer, the peeler and the laminator within a confined space. The relative location of the various elements can have a profound effect on the speed, efficiency and cost of manufacturing such a system. Further, the options are complicated by the fact that the thermographic print media is specifically designed to fracture along a frangible tab so that the peel sheet may be separated from the exposed media. While this thermographic print media is robust when handled properly, it can experience premature delamination if it is stressed excessively. This is particularly true if the thermographic material is handled in such a way that a stress is placed on the frangible tab before the stripping or peeling operation is imminent.

SUMMARY OF THE INVENTION

The present invention is based upon the discovery that an apparatus for sheetwise dry processing of peelable thermographic print media may be accomplished by feeding the sheets, one at a time, with the tab trailing the sheet into an optical printer having clamps for engaging the respective leading and trailing edges of the media so as to minimize stress on the frangible portion thereof. Printing is achieved by exposing the image forming layer through the peel sheet to a beam of selectively applied radiant energy. After printing, the printer is operative to outfeed the media in reverse orientation so that the tab leads for engagement into a peeler which separates the peel sheet from the image forming layer adhered to the substrate. The thus separated substrate with the image formed thereon is then passed between the nip of a pair of laminating rolls for engagement with a thermally responsive film sheet which transfers a thermal protective coating onto the surface of the substrate carrying the image forming layer.

In a preferred embodiment of the invention, each of the stages or modules including the feeder, the printer, the peeler and the laminator, are separated by a selected operational distance. This means that the media is separated from the function of one module as it passes to the next module. The operational distance is selected so as to correspond to the length of the film or media in its direction of travel between each module.

In a particular embodiment, the invention is directed to an apparatus for sheetwise dry processing, in a selected direction, of thermographic print media formed of a substrate and an overlying laminated disposable peel sheet joined to the substrate in overlying relation by a multicomponent adhesive image forming edge, said substrate having a tab joined to the peel sheet and formed in a free surface thereof along a score line adjacent the marginal edge of the media. The apparatus comprises feeder means for feeding the sheets, one at a time, from a first position and orientation to a second position and orientation with the tab at the trailing edge. Optical print roller means is mounted for reversible rotation in infeed and outfeed directions, and includes a wrapping surface for receiving the sheet from the sheet feeder in intimate confronting contact thereabout. The print roller means includes adjacent leading and trailing edge clamps for engaging the respective leading and trailing edges of the sheet as received from the sheet feeder means in the infeed direction to secure the sheet on the print roller means with the peel sheet facing outwardly thereof. Printer means cooperates with the print roller means for exposing the substrate to radiant energy as the print roller means rotates. Thereafter, the print roller means releases the sheet so that peeler means receives the sheet from the print roller means with the tab at the leading edge. The peeler means engages the tab from the free surface of the substrate for bending the substrate about the score line and causing it to fracture therealong. The peeler means pulls the peel sheet relative to the substrate for separating the said peel sheet therefrom to produce a peeled substrate surface. Thermal lamination means receives the substrate with the peeled substrate surface oriented for thermal laminating engagement with a thermosensitive film having a thermo-transferrable layer thereon for transfer onto the image forming layer adhered to the substrate in response to the application of heat.

The print roller means and the peeler means employ anti-skew systems designed to align the laminate sheet for processing. The print roller means also employs outfeed means for facilitating transfer of the sheet to the peeler.

DESCRIPTION OF THE INVENTION

Figure 1:
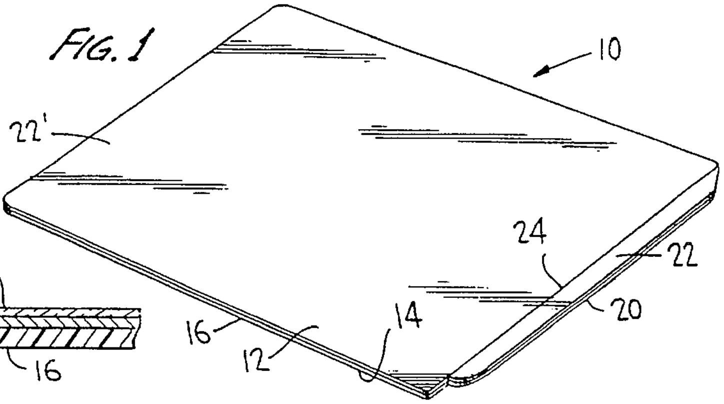
FIG. 1 is a perspective view of a laminated thermographic print media for use in the present invention.
Figure 2:
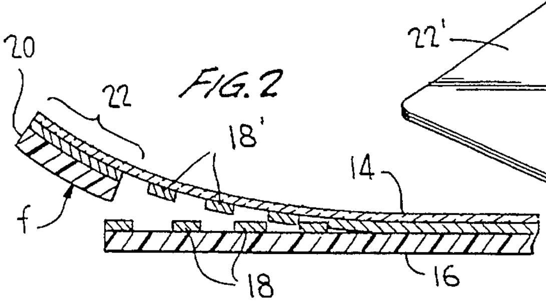
FIG. 2 is a side sectional elevation of the thermographic print media shown in FIG. 1.

Referring to FIGS. 1 and 2, a laminate film 10 is shown in an exemplary embodiment as a thermal imaging film unit of the general kind comprising, for example, a thermographic film media 10 formed of a substrate 12 and an overlying disposable peel sheet 14 adhesively connected by an intermediate multicomponent image forming layer 16. Image forming layer 16 generally comprises a pigment material such as carbon black and a binder therefor. The image forming layer may comprise a composite of several layers conductive to forming an image of desirably high resolution and optical density as a result of thermal exposure and subsequent processing, including delamination as provided by the invention. Lamination of sheet 14 onto the coated sheet 12 provides the laminar composite sheet structure of the film 10.

In the laminar composite sheet structure of FIGS. 1 and 2, the adhesive bond between substrate sheet 12 and image forming layer 16 is, in its initial unexposed state, greater than the bond strength between peel sheet 14 and image forming layer 16. As a result of exposure, the bond between exposed portions of image forming layer 16 and peel sheet 14 becomes stronger than the bond existing between substrate 12 and the portions of image forming layer 16. Abutting portions of image forming layer 16 are, thus, caused by thermal exposure to be adherent to peel sheet 14 at bond strengths less than and greater than the uniform bond strength between image forming layer 16 and substrate 12. As a result of laser exposure, portions of image forming layer 16 become more firmly bonded to peel sheet 14.

For purposes of the invention, it is sufficient to note that the image forming layer 16 is such that upon exposure it may be ruptured in the direction generally normal to its two surfaces along lines defined by exposure to thermal energy. Portions of the layers 16 subjected to exposure can then be separated from portions not affected by exposure to thus provide complementary images on the respective substrate and peel sheets 12 and 14 of the film 10. The complementary images 18 and 18' are represented by the broken portions of the layer 16 illustrated in FIG. 2.

To facilitate separation of the layers 12 and 14, a frangible tab 22 is provided. The adhered layers 12 and 14 are connected together by the frangible tab 22 formed near an edge 20 along a score line 24 in the substrate 12. A force f directed at the tab 22 from the free surface of the substrate 12 puts such surface of the substrate 12 into tension causing failure along the score line 24 so that the substrate 12 may be separated from the peel sheet 14, as illustrated in FIG. 2.

Figure 3:
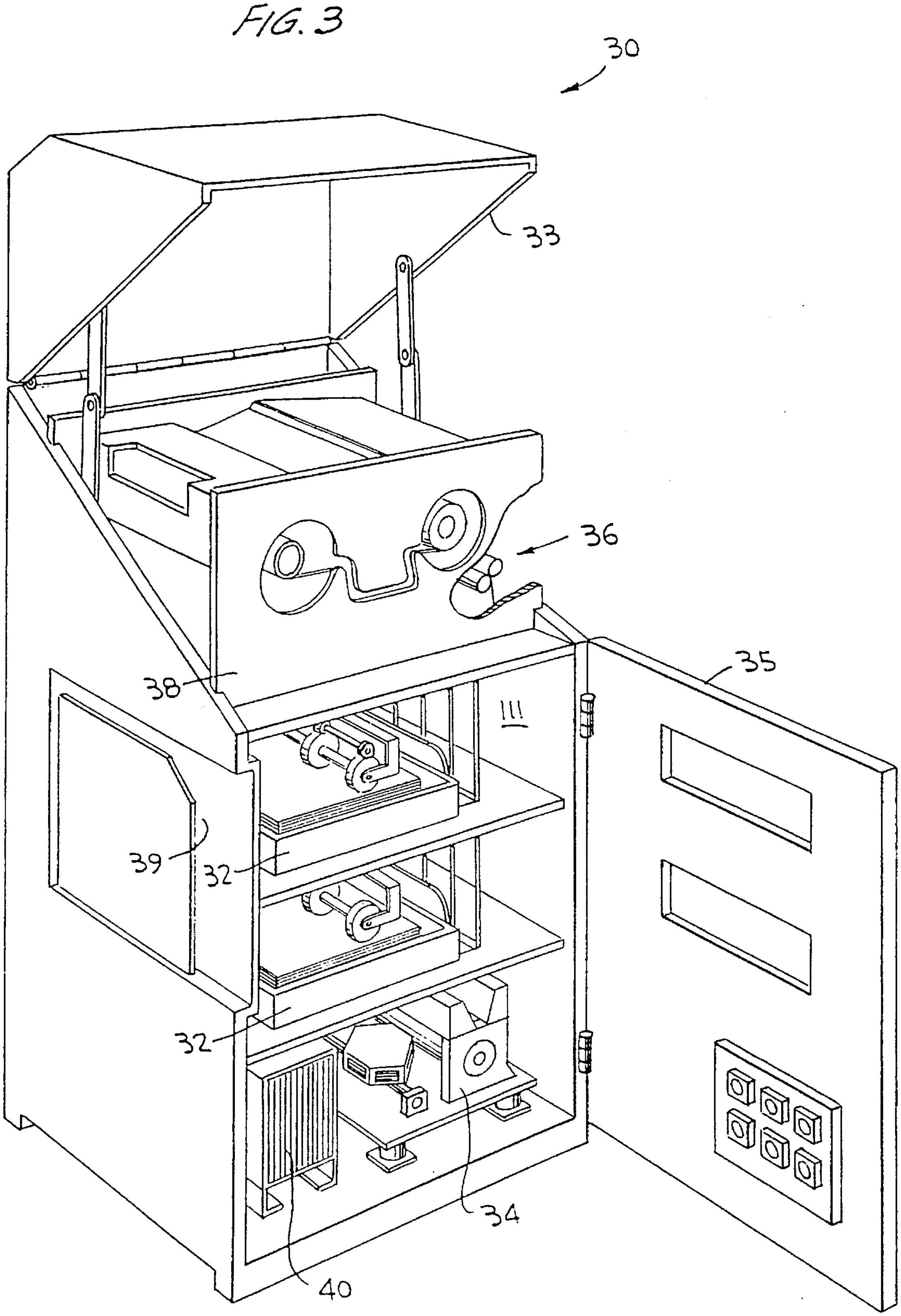
FIG. 3 is an overall perspective view of an apparatus for dry processing optical print media according to the invention.
Figure 40:
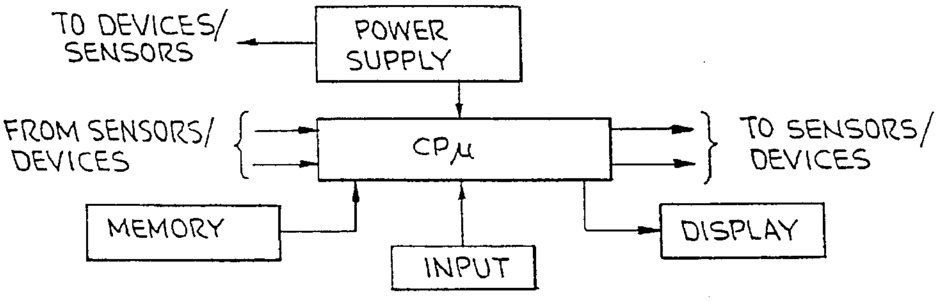
FIG. 40 is a schematic block diagram of a control system for operating the apparatus of the invention.

As shown in FIG. 3, the invention generally comprises a system 30 for dry processing thermographic film or media. The system, generally secured in a housing 31 (shown with hatch 33 and front door 35 open), comprises a sheet feeder 32 (which may be a dual sheet feeder as shown and discussed hereinafter), an optical printer 34, a peeler or delaminator 36, a laminator 38, and a discharge 39. A control package 40 (FIG. 40) comprising a programmable controller (e.g. multiple, CPU's), power supply, devices and sensors, memory, a display and an input as well as appropriate wiring is also provided. In the embodiment illustrated, the sheet feeder 32 includes a plurality of sheet feeder receptacles which contain the sheets and which are independently operable so that individual sheets can be fed therefrom and so that an empty one of such receptacles will not prevent printing of an image in order to reload such empty receptacle.

Figure 4:
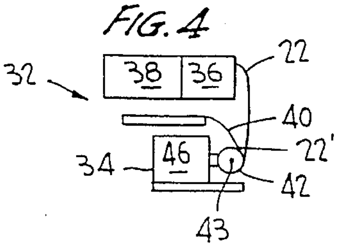
FIGS. 4–17 are schematic diagrams illustrating a variety of layout options for use in the present invention.
Figure 12:
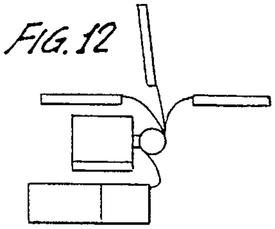
Figure 13:
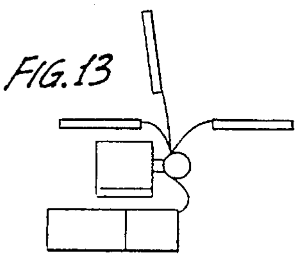
Figure 14:
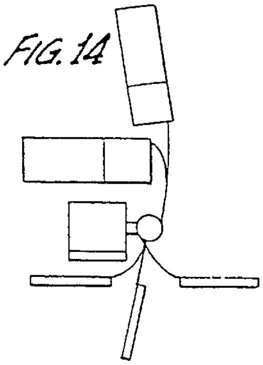
Figure 15:
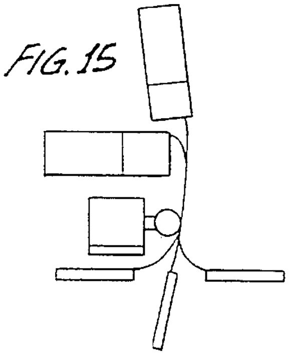

FIGS. 4–17 illustrate various layout options for the system for dry processing thermographic film or media according to the invention. In FIG. 4, the film 10 is arranged in the feeder 32 with the peeler sheet facing down and the tab 22 adjacent the discharge end 40 proximate the printer 34.

The printer 34 comprises a rotatable drum 42 mounted on an axis 43 for receiving the film or media 10 in intimate conforming contact. The drum 42 has clamps for engaging the respective leading and trailing edges of the film 10 as it enters and leaves the printer 34. The clamps are detailed hereinafter.

The printer 34 also includes a helical scan optical stage and laser head assembly 46. See commonly assigned U.S. Pat. No. 5,159,352 for a description of such an assembly which is incorporated by reference. As illustrated in FIG. 4, the drum 42 rotates about an axis (perpendicular to the page of the drawing) and the optical stage/laser head assembly 46 moves along the drum 42 into and out of the page for scanning the film 10.

The film enters the printer 34 with a relatively robust end (namely the end opposite the tab end) entering the printer for engaging the clamp 44A. The film engages the clamp 44A which is thereafter closed and the drum 42 is rotated clockwise to cause the film 10 to be wrapped around the drum 42. Wrapping is accomplished by an auxiliary roller system described hereinafter. After the drum is rotated approximately or near 360°, the tab end of the film approaches a second clamp 44B, which is closed to thereby secure the film to the drum 42. The optical printer 34 is then activated so that the optical stage and laser 46 delivers a beam of modulated thermal laser energy onto the film for exposing its active portion. After the film is exposed by rapid rotation of the drum 42 and scanning by the laser 46, the drum 42 is stopped with the second clamp 44B oriented for release of the film below the peeler 36. The drum 42 is then rotated counterclockwise so that the tab end 22 of the film 10 becomes the leading edge and follows the path between the printer 34 and the peeler 36. The tab end of the film is positioned and secured in the peeler 36 at a selected location with respect to a pair of peel rolls and a tab breaking roller carried by a rotatable frame. The tab breaking roller engages the film 10 from the scored side so as to put tension in the film surface. This causes the substrate 12 to fail along the score line whereupon the tab 22 is separated from the substrate 12 and captured between the tab breaking roller and one of the peel rollers. The film 10 is advanced past a deflector roller whereupon the frame carrying the tab breaking roller and deflector roller are rotated in the opposite direction to establish a selected deflector angle between the peel sheet 14 and the substrate 12. The substrate 12 is advanced into position upstream of the laminator 38 and the peel sheet is advanced along a discharge path described hereinafter for disposal.

The substrate 12 with its exposed image forming surface 16 is oriented so as to engage a thermally active material carried by a film sheet in confronting intimate contact. The film sheet and the substrate are captured in the nip formed by a cold roller and a hot roller which causes the thermally active material on the film to be transferred onto the image forming layer 16 of the substrate 14 to provide a protective coating thereon. Thereafter, the film sheet is separated from the laminated substrate which is discharged from the laminator 38.

In accordance with the present invention, the feeder 32, the printer 34, the peeler 36 and the laminator 38 are generally located as illustrated in FIG. 4. In such an arrangement, at least one and preferably two feeders 32 are located centrally of the apparatus 30. Each feeder has a discharge end 40 which is aligned with the infeed to the printer 34 located below the feeder 32, as shown. The drum 42 receives the film 10 on the same side that it discharges the film 10. This allows the film 10 to be fed onto the drum 42 with the non-tab 22' end leading and to be outfed from the drum 42 with the tab 22 leading. This protects the tab 22 until it is necessary to feed the tab 22 into the peeler 36.

The laminator 38 contains a heated laminating roller, discussed hereinafter, which is employed to thermally transfer a protective coating into the image forming layer. Thus, substantial heat is generated which must be dissipated. Also, the laminator 38 is periodically serviced to replace the web carrying the laminating material. It is advantageous to locate the laminator in the upper part of the apparatus so as to facilitate servicing through the upper hatch 33. In the case of heat dissipation, because the heat produced in the laminator 38 tends to rise, it is advantageous to avoid locating the laminator below the other modules which may be adversely affected by temperature swings associated with its operation.

Figure 5:
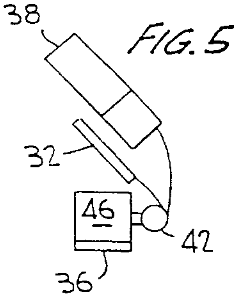
Figure 6:
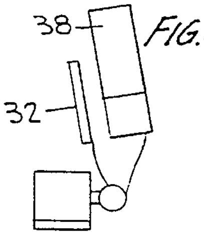
Figure 7:
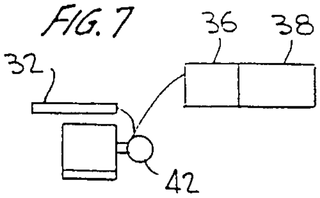
Figure 8:
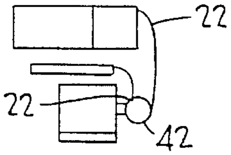
Figure 16:
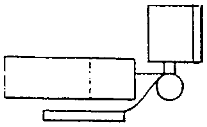
Figure 9:
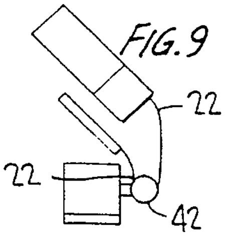
Figure 10:
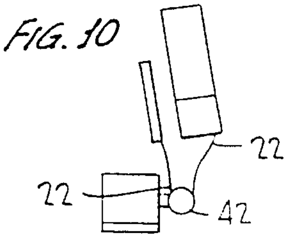
Figure 11:
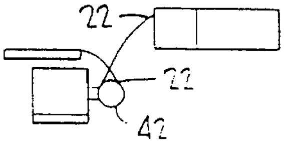
Figure 17:
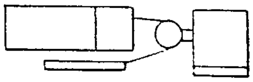

FIGS. 5, 6 and 7 illustrate other possible arrangements for orienting the components or modules of the present invention. In FIG. 5, the feeder 32, the peeler 36 and the laminator 38 are disposed at an angle with respect to the vertical so as to establish less drastic angles between the components and to thereby facilitate infeed and outfeed from the drum 42. In FIG. 6, the feeder 32, the peeler 36 and the laminator 38 are oriented close to the vertical.

In FIG. 7, the feeder 32, the peeler 36 and the laminator 38 are on opposite sides of the drum 42. In all the arrangements of FIGS. 4–7, the tab 22 trails as it enters the drum 42 so as to protect it from damage.

In the arrangements illustrated in FIGS. 8–11, the tab 22 is fed first. The advantage is that the drum 42 only needs operate in one direction, namely with the tab entering the first clamp and exiting the drum in the same direction of rotation. The problem, however, of protecting the film from delamination is aggravated when the tab is always first. Thus, while it is more complicated mechanically to provide for a reversible drum 42, such a complication is alleviated by the fact that processing of the film is much more reliable. Also, the driving motors which are utilized to operate the various components are preferably reversible stepping motors which may be readily controlled by an appropriately programmed microprocessor for precision operation. However, D.C. motors with encoders can be used.

Illustrations in FIGS. 12–17 show other possible arrangements for orienting the various components. The arrangements each have unique problems associated with processing the thermographic media. Some provide mechanical advantages. However, the arrangement illustrated in FIG. 3 is preferred because it allows for the most convenient handling of the film and provides a relatively small footprint for the system.

Figures 18, 23:
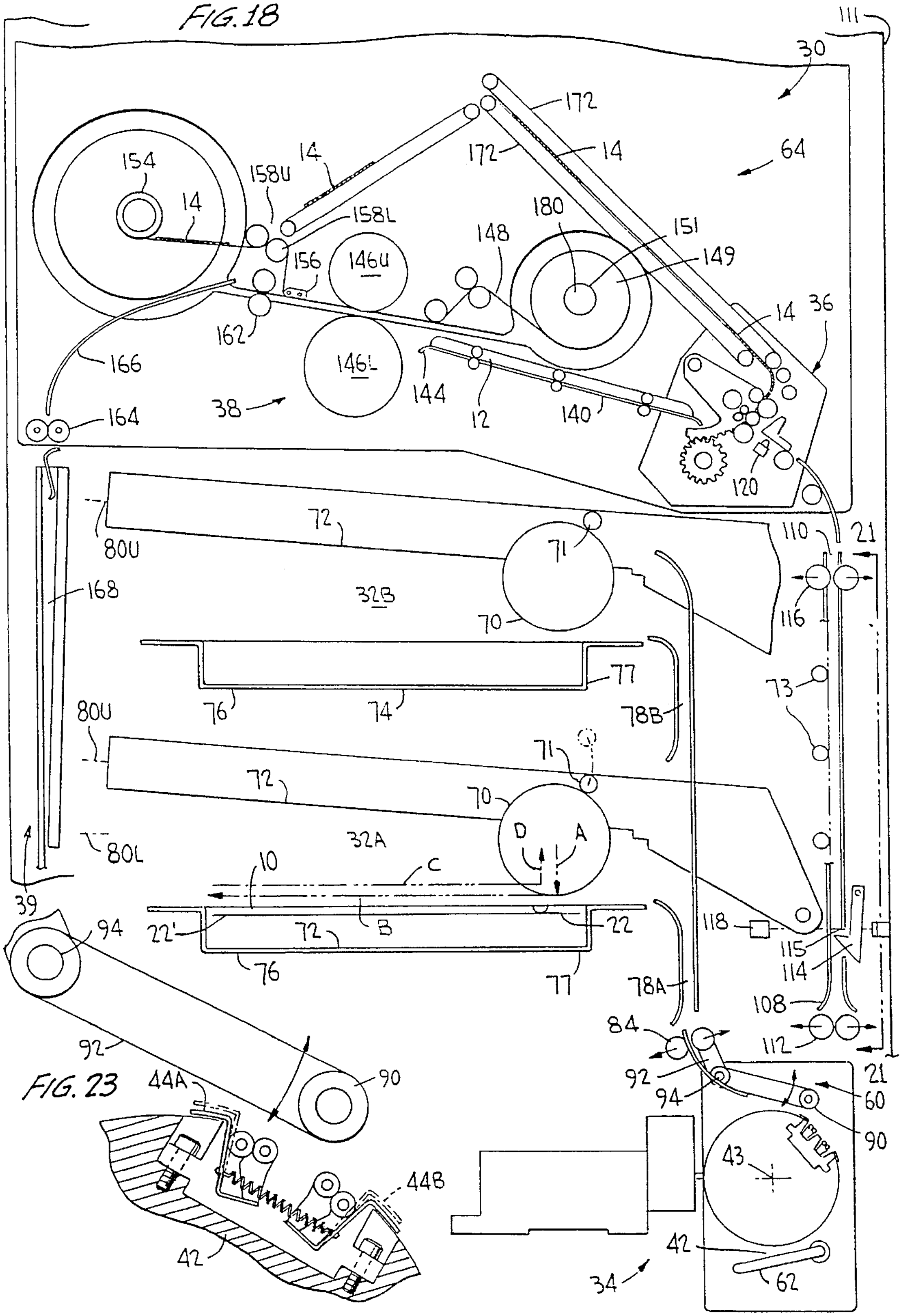
FIG. 18 is a schematic illustration showing details of a selected system layout in accordance with the present invention.
FIG. 23 is a detail of the print roll clamps and wrapper roll.

FIG. 18 illustrates an exemplary embodiment of the invention in greater detail. As illustrated, the system 30 includes the various modules described above, namely at least one and preferably two feeders 32A and 32B, an optical printer 34, a peeler 36 and a laminator 38. An outlet or discharge 39 is also provided. In addition, there are a number of features which enhance the operation and reliability of the system, among which include: an infeed de-skewing apparatus 60 for the drum 42; an outfeed helper roll apparatus 62, likewise for the drum 42; and a peel sheet transport 64 for disposing of the stripped peel sheet material. Also, the plural sheet feeders 32A and 32B are independently operable so that individual sheets may be fed from either tray. Thus, an empty film tray will not prevent printing of an image in order to reload such empty tray.

Figure 19:
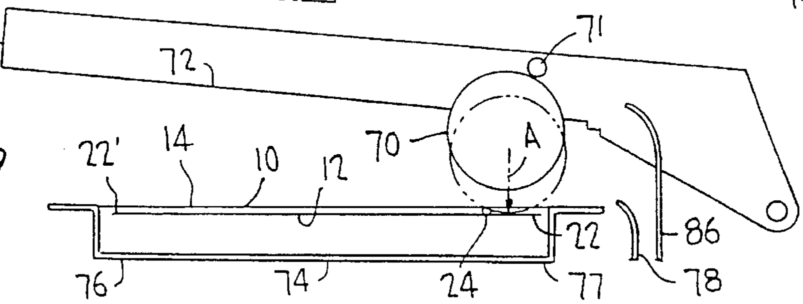
FIGS. 19–22 are schematic side elevations illustrating the feeder mechanism in various stages of operation.
Figure 20:
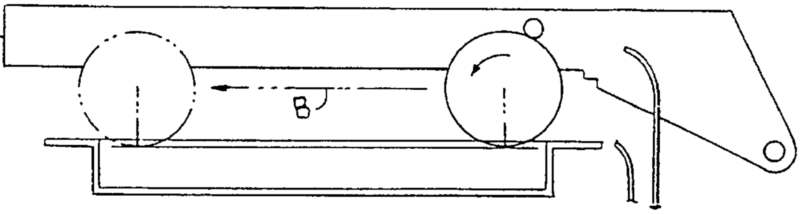
Figure 21:
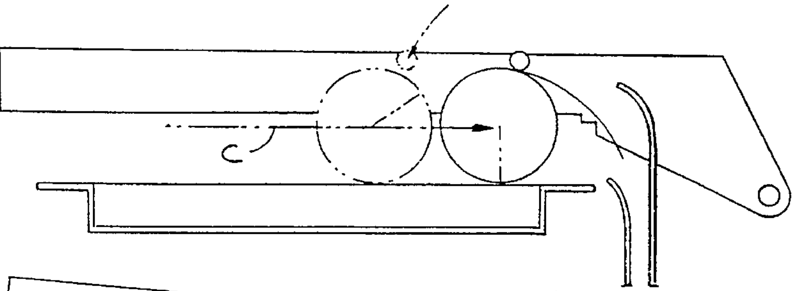
Figure 22:
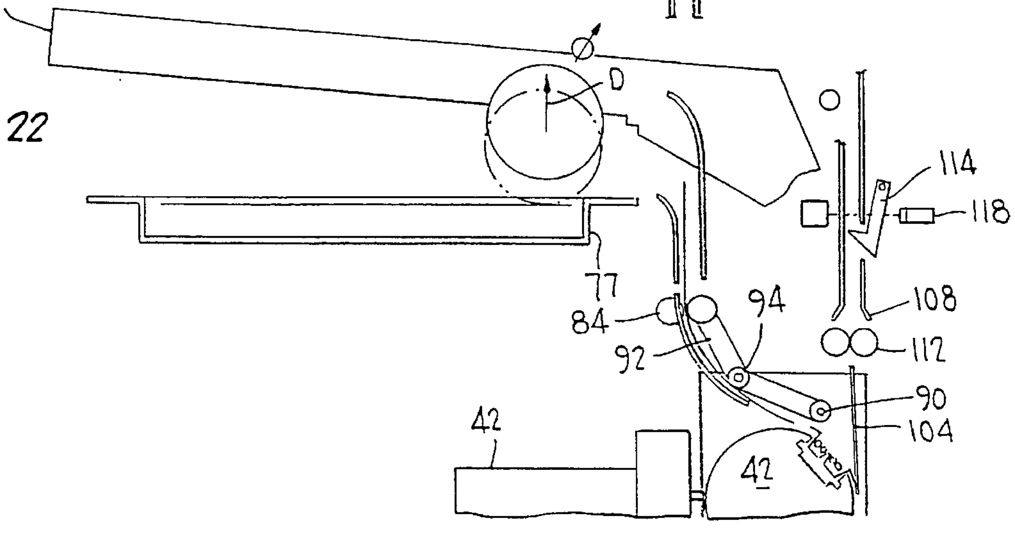

With reference to FIG. 18 and the sequence diagrams of FIGS. 19–22, one or the other of the feeders 32A and 32B is selected for delivering a sheet of thermographic film 10 to the printer 34. In a preferred embodiment, the feeder can be like that described in copending U.S. patent application Ser. No. 08/240,245 by Obermiller et al. The last noted application is incorporated herein by reference and only those portions necessary to understand the present invention are set forth herein. Each feeder 32A–32B employs a vacuum roll 70 reciprocally mounted on an arm 72. Sheets of film 10 are secured or held in a film tray 74 which has a respective film pickup and discharge ends 76 and 77. The tab end 22 is at the discharge end 77 and the peel sheet is facing down. Each feeder 32A and 32B likewise has a corresponding discharge path 78A–78B near the discharge end 77 of the tray 74, see FIG. 18. The arm 72 is rotatable about the pivot 73 between respective lower and upper positions 80L and 80U. Thus, the vacuum roller 70 is adapted to move along a path, shown by arrows A-B-C-D, beginning at the discharge position 77 with the pivot arm 72 up (FIG. 19). The vacuum roller 70 is lowered to engage a film sheet 10 (path A) and is activated to roll along the film sheet 10 to the pickup end 76 (path B, FIG. 20) where a vacuum is applied to the vacuum roll 70 to secure the non-tab end 22' of the film 10 at the pickup end 76. The vacuum roll then is activated to move along path C (FIG. 21) returning to the discharge end 77 and rolling up the film 10 thereabout. After the non-tab end 22' of the film 10 passes under a wrapping roller 71 it thereafter engages the film 10 securing the film 10. The vacuum is then released freeing the non-tab end 22' (FIG. 20). When the vacuum roller reaches discharge end 77, vacuum is reapplied to secure the film 10 to the roller 70 without touching the tab 22 at a location immediately 10 adjacent the tab 22 rearwardly of the score line 24. The vacuum roller 70 and the attached film 10 is then lifted upwardly (path D, FIG. 22) and rotates to direct the film into the discharge 78. The vacuum is then terminated and the film is released with the tab 22 trailing. The film 10 is confined to discharge paths 78A–78B by means of appropriately located deflectors 86.

Figure 24:
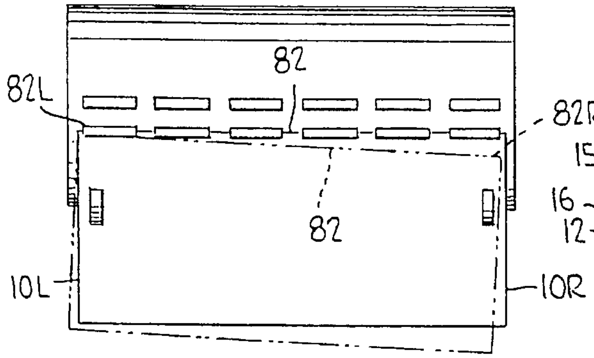
FIG. 24 is an elevation illustrating an anti-skew mechanism for the print roll.
Figure 37:
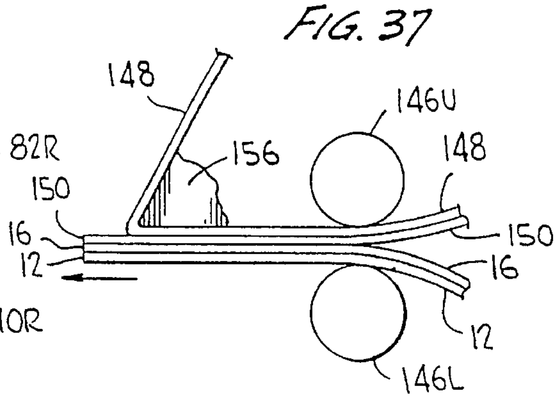
FIG. 37 is a schematic illustration of the operation of the laminator.

In order to assure that the film 10 is square or de-skewed relative to the printer 34, a printer infeed de-skew mechanism 60 is employed, see FIGS. 18, 23 and 24 and sequence diagrams 25–27. The leading edge 82 of the film 10 at the non-tab end 22' is directed in between a pair of laterally spaced apart left and right infeed clutch rollers 84L–84R. The infeed clutch rollers 84A–84B each include a coaxial clutch of a known kind, and are disposed to engage the film 10 near its corresponding left and right marginal edges 10L–10R, FIG. 24. The drum 42 has a pair of clamps 44A–44B and is initially oriented at a first angular position (FIG. 25) near the vertical at about 30° and with one clamp 44A open for receiving the leading edge 82 of the film 10. The film should be located on the drum 42 so that the leading edge 82 is parallel to the orientation of the clamp 44A which in turn is parallel to the axis 45 of the drum. This is accomplished by driving the infeed rolls 84L–84R until the film 10 engages the clamp 44A (see FIG. 24). If the film 10 enters the clamp 44A such that the leading edge 82 is skewed relative thereto (shown in phantom), the film 10 is urged forward towards the clamp 44A until the left side 82A of the leading edge 82 engages the clamp whereupon the corresponding left side infeed clutch roll 84L slips. The right side of the film 10 which has not yet contacted the clamp 44A is continuously driven forward by the corresponding right side infeed clutch roll 84R until it engages the clamp whereupon the film is de-skewed.

Figure 25:
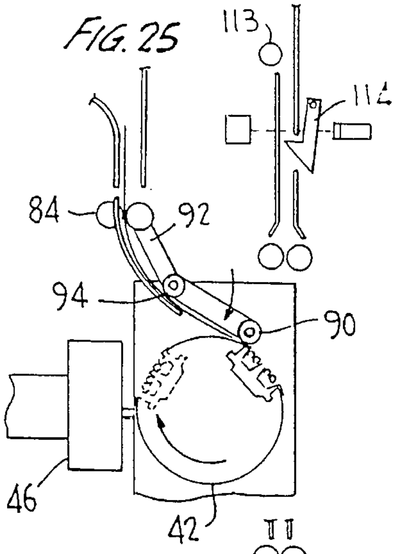
FIGS. 25–27 are schematic side elevations illustrating the loading and unloading of the print roller.
Figure 26:
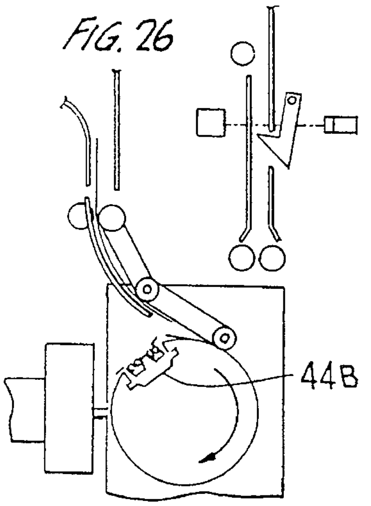
Figure 27:
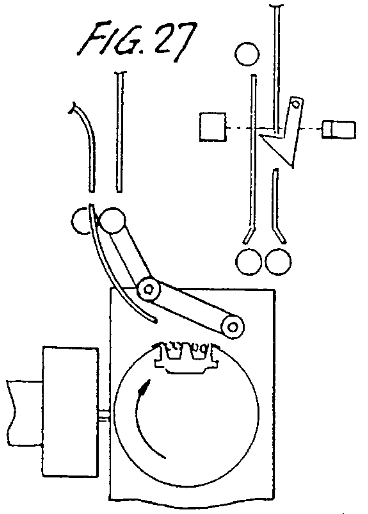

After the film is de-skewed, clamp 44A closes and the print roller drum 44 receives the film 10, see FIGS. 25–27. The drum 42 is rotated clockwise (FIG. 25). At the same time, the infeed rollers 84 may be separated. The drum and clamps can be like those described in copending U.S. patent application Ser. No. 08/241,148 filed May 10, 1994 by G. Whiteside et al. This application is incorporated herein by reference and only those portions necessary to understand the present invention are set forth herein.

A wrapping roller 90 (FIGS. 25–27) engages the film 10 to urge it against the drum 42. In the arrangement, the infeed rollers 84 may be linked to the wrapping roller 90 by an interconnected lever 92 pivoted at a pivot connection 94 parallel to the drum axis 45. Thus, when the infeed rolls 84 open, the wrapping roller 90 engages the film 10 simultaneously (FIG. 26). Also, the wrapping roller 60 is moved away from the drum 42 when the clamps move to the position shown in FIG. 27.

With reference to FIGS. 25–27, drum 42 is rotated (clockwise) so that the clamp 44B comes about to near a vertical position) (FIG. 26), the trailing or tab end 22 of the film is thus oriented for engaging the clamp 44B. The wrapping roller 90 urges the film against the drum 42 and likewise the tab end 22 of the film 10 is oriented so that it is aligned with the clamp 44B which is then closed thus securing the film 10 to the drum 42 (FIG. 27). The wrapping roller 90 is then retracted and the drum is then brought up to a high rotational speed (FIG. 27). At the same time, the optical stage and laser head assembly 46 are activated to direct a beam of laser energy at the film 10 to thermally expose the same and provide an image thereon.

Figure 28:
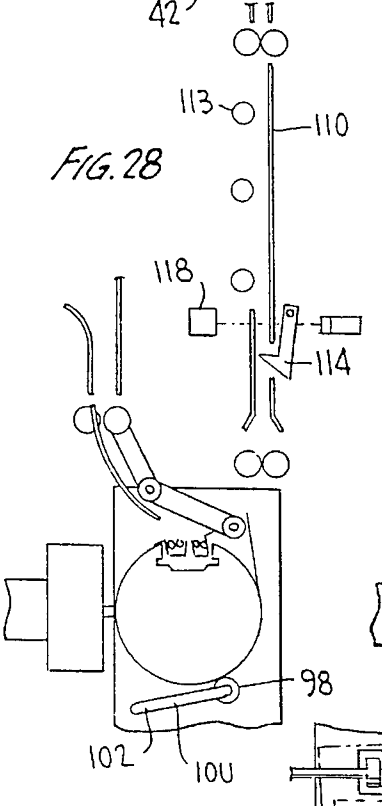
FIGS. 28–30 are schematic side elevations illustrating the peeler in feed de-skew mechanism.
Figure 29:
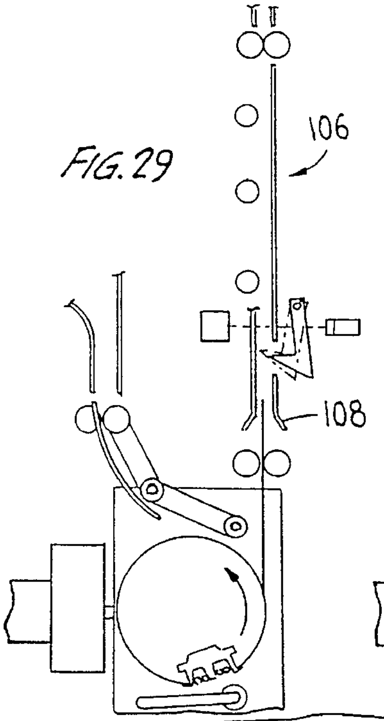
Figure 30:
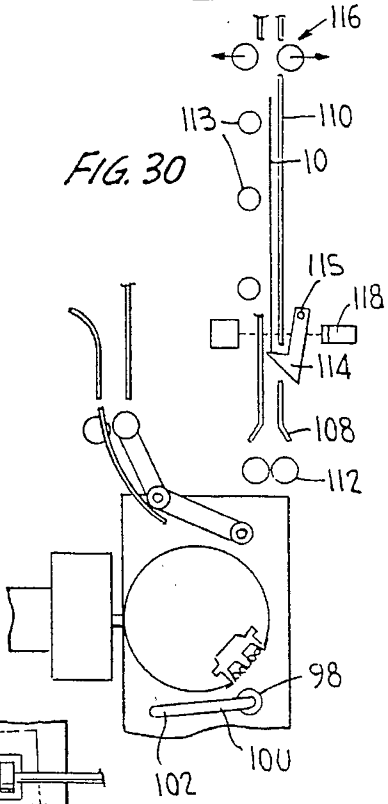
Figure 31:
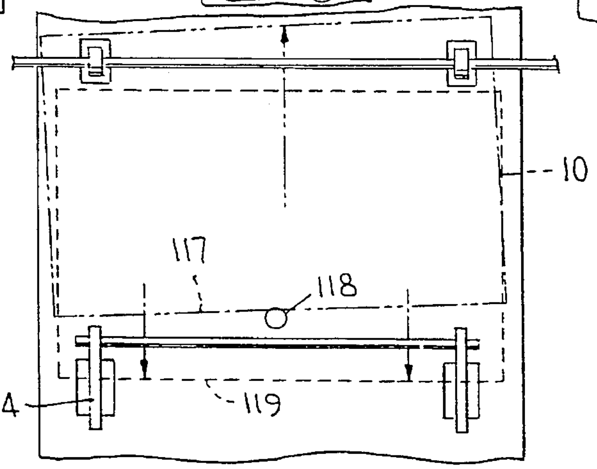
FIG. 31 is a front elevation of the peeler infeed de-skew mechanism.
Figure 32:
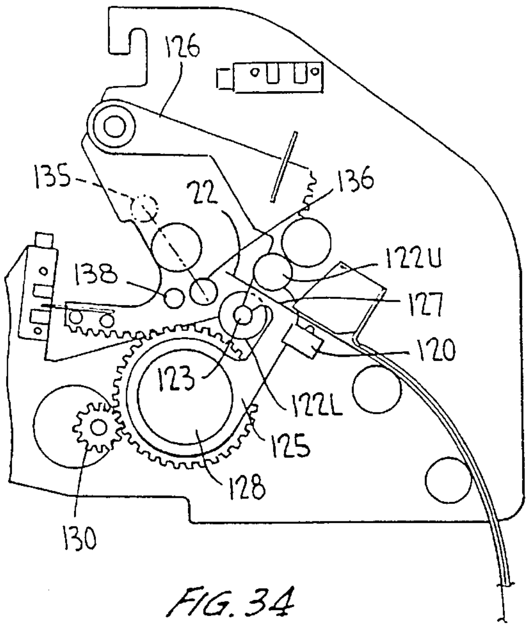
FIGS. 32–36 are schematic side elevations illustrating the operation of the peeler mechanism in various stages of operation.

Referring to FIGS. 28–31, after the thermographic film 10 is exposed, the drum 42 is decelerated and brought to a halt with the trailing clamp 44B securing the tab end 22 of the film 10 oriented as shown (FIG. 28). An outfeed helper roller 98 is mounted on an arm 100 pivoted at 102. The helper roller 98 is mounted adjacent a lower portion of the drum 42. When the drum 42 stops, the helper roller 98 engages the film 10. Clamp 44B is then open allowing the tab end 22 of the film to be released against deflector 104 (FIG. 28). The drum 42 is then rotated counterclockwise with the helper roller 98 engaged capturing the film therebetween. The tab end 22 of the film 10 which now leads is then directed upwardly along vertical deflector 104. As the drum 42 rotates counterclockwise, the film 10 is thus fed upwardly into a peeler infeed path 106 (FIG. 29). The peeler infeed path 106 has a flared inlet end 108 and an outlet end 110 and may include a removable outboard panel 111 and a plurality of opposed spaced apart rows of capturing idler rollers 113. The jammed material can be removed from an opened front panel. The panel 111 and idlers 113 facilitate jam clearance between the rows. A pair of retractable infeed rollers 112 are disposed upstream of the inlet 108 of the peeler infeed path 106. The infeed rollers 112 capture the tab end 22 of the film 10 and direct the film into the infeed path 106 and towards the outlet 110.

The peeler infeed path 106 is adapted to provide a de-skew function for the film 10 prior to entry into the peeler 36. The de-skew function is briefly described herein for clarity. A pair of spring loaded de-skew cams 114 are provided downstream of the infeed rolls 112. The de-skew cams 114 are spring biased to span the infeed path 106 and are deflected out of the way as the film 10 is driven into the infeed path 106 by the infeed rollers 112. As the film is driven upwardly in the infeed path 106, the tab 22 passes between a pair of peeler infeed rolls 116 which draw the film 10 forward until the trailing edge of the film passes the cams 114. When this occurs, the cams 114 are released by the film and return to span the infeed path 106. Upward facing surfaces 115 of the cams 114 are thus presented in opposition to a trailing edge 117 of the film.

An optical sensor 118 operatively coupled to the infeed rolls 116 senses passage of the trailing edge 117 of the film and causes the infeed rolls 116 to separate whereupon the film 10 drops by gravity against the upper support surface 115 of the cams and is thus de-skewed (FIGS. 28–31). If desired, additional optical sensors may be employed along the infeed path 106 to assure nonambiguous detection of the film 10.

Thereafter, the peeler infeed rolls 116 reengage to drive the tab 22 of the film 10 forward towards an optical detector 120 at the inlet of the peeler 36 (FIG. 18 and the sequence drawings of FIGS. 32–36). Only those aspects of the peeler 36 are presented for understanding the present invention. For a detailed description thereof, reference is made to commonly assigned and copending application U.S. Ser. No. 08/241,149 filed May 10, 1994 by D. Van Allen et al. which is incorporated herein by reference. The leading edge or tab end 22 of the film is then passed between a pair of upper and lower peel rolls 122U–122L in the peeler 36. The peel rolls 122U and 122L are mounted for relative motion. The lower peel roll 122L is mounted on spring loaded shaft 123 and is held retracted by gear mounted cam 125. With the nip 127 open, the infeed rollers 116 drive the leading edge of the film past the detector 120. The rotation of the peeler infeed rollers 116 is closely monitored so that the film is driven to a precise position with the leading edge 22 a selected distance d downstream of the nip 127 formed between the rolls 122U–122L. The film 10 is then stopped (FIG. 32) between the separated peel rolls 122U–122L.

Figure 34:
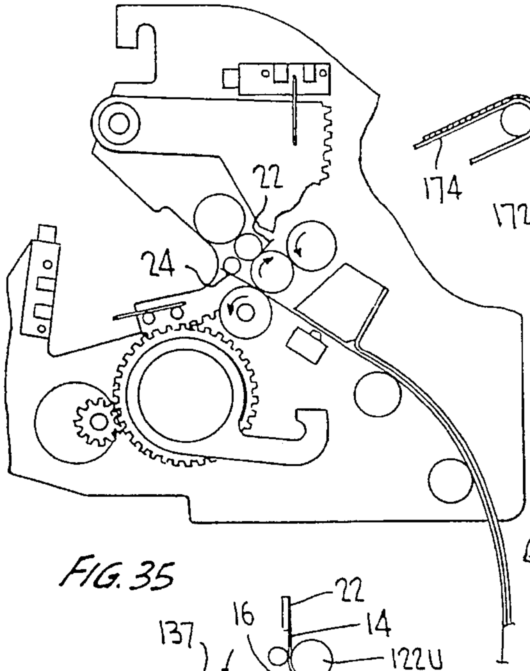
Figure 35:
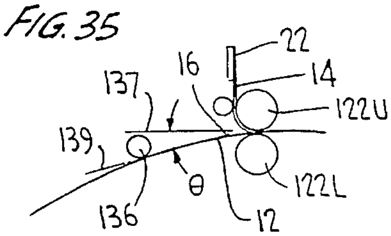

A roller frame 126 is rotatably driven by a gear 128, which in turn is driven by a motor activated pinion 130. The gear 128 also supports and rotates the cam 125 which releases lower peel roll 122L and allows the nip 127 to close and capture the film 10 (FIGS. 34). This secures the film firmly in position so that, as discussed below, the tab 22 may be broken without prematurely delaminating the film.

Figure 33:
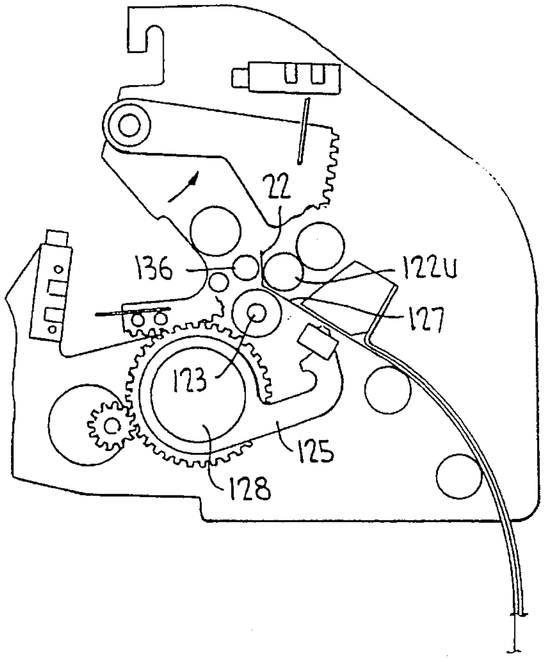

The frame member 126 carries a tab breaking roll 136 and a deflector roller 138 and is rotated (counterclockwise) so that the upper and lower peel rolls 122U–122L are closed to thereby capture the film 10 in the nip 12. The tab breaking roll 136 moving with the frame 126 engages the tab 22 after the nip 127 closes on the film. The tab breaking roll 128 engages the scored side of the film so as to impart stress on the substrate 12 (see FIG. 2) and cause the score line 24 to fracture thereby separating the tab 22 from the substrate 12 (FIG. 33). The tab breaking roll 136 moves against the upper peel roll 122U capturing the tab and peel sheet 14 therebetween.

The tab breaking roller 136 is driven through a suitable rotation transmission device by a constant torque motor 135 to cause the peel sheet 14 to be pulled away from the substrate 12 and the adhered image layer 16 under constant force. This substantially prevents jamming of the apparatus.

Figure 36:
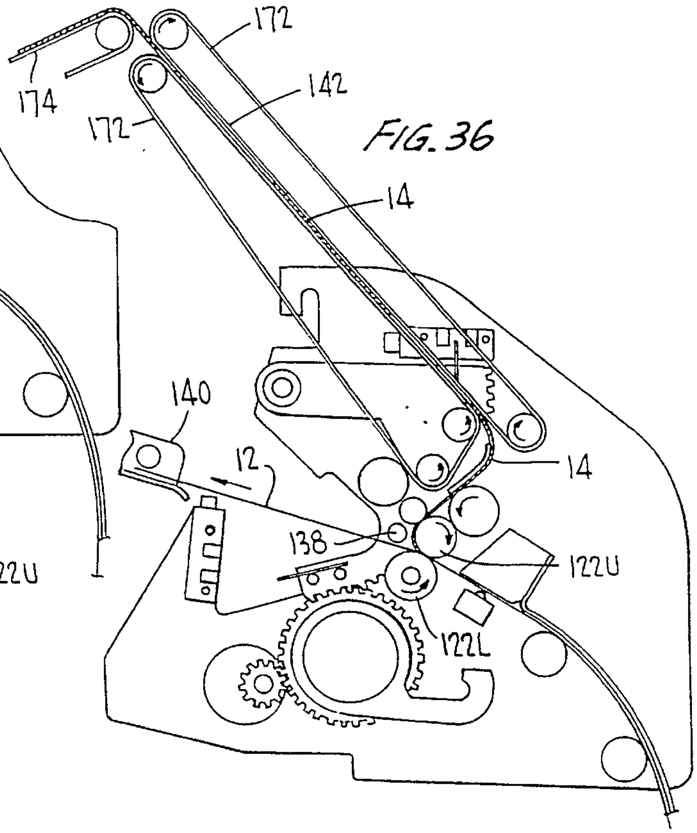

After the tab 22 is fractured, the leading edge of the substrate 12 (now fractured score line 24), which has been separated from the tab 22, is then advanced by a selected short amount as determined by sensing the rotation of the lower peel roll 122L. At the same time, the tab breaking roll is rotated to advance the peel sheet 14 (FIG. 34). This short feed positions the substrate 12 and adhered image layer 16 under deflector roll 138. The frame 126 is then rotated clockwise to cause the deflector roll 138 to engage the substrate and orient it at a selected deflection angle θ between the undeflected position of the substrate 12 shown by the dotted line 137 in FIG. 35 and the deflected position 139. After the deflection angle θ is established, the substrate 12 and the peel sheet 14 are advanced causing the layers to separate in a controlled manner (FIG. 36). The deflection angle θ may be adjusted by selective positionment of the deflector roll 138 to thereby finely adjust peel characteristics.

As the substrate 12, which carries the image in the image layer 16 is moved forward, it is separated from the peel sheet 14 and advanced to a laminator infeed tray 140. At the same time, the peel sheet is advanced into peel sheet transport 142 (FIG. 36).

Referring to FIG. 18 and 37–39, laminator 38 is located near the discharge end 144 of the tray 140. The laminator 38 is adapted to capture the substrate 14 and image layer 16 between a pair of upper and lower laminator rolls 146U and 146L. The upper laminating roll 146U may be heated and the lower laminating roll 146L may be cold.

The lamination process is discussed briefly. Reference is made to commonly assigned U.S. patent application Ser. No. 08/240,854 filed May 10, 1994, for a description of a laminator system which is incorporated herein by reference. Only those portions necessary to understand the present invention are set forth herein. The substrate 14 with the image forming layer 16 facing up, is directed between the laminating rolls 146U and 146L. A web 148 having a multicomponent thermosensitive layer 150 on the underside then is mounted on a supply roll 152 and is directed between the laminating rolls 146U–146L. The web 148 is in the form of a roll 149 wound on a core 151 mounted on a supply spindle 152 and threaded to an empty core 153 on a takeup spindle 154. The thermosensitive layer 150 on the underside of the web 148 is disposed between the laminating rolls so that it confronts the image forming layer 16 on the substrate 14. The web 148 and the substrate 14 are thus carried between the laminating rolls 146U–146L whereupon heat from the upper roll 132U causes the thermosensitive layer 150 to melt and become attached to the image forming layer 16, thereby coating the same and protecting the image formed therein. Thereafter, the resulting laminated substrate 14 is carried under a stripper 156. The web is threaded upwardly between a pair of idlers 158U and 158L and is pulled by the takeup reel 154. As the laminator moves forward past the edge 160 of the peeler 156, the web 148 is stripped and the thermosensitive layer 150 remains adhered to the image forming layer 16, as shown. The laminated substrate is then transported via spaced pairs of feed rolls 162–164 and an intermediate deflector 166 to a discharge receptacle or pocket 168 in discharge 39.

In accordance with another feature of the invention shown in FIGS. 18 and 36, the peel sheet 14 is carried upwardly from the peeler 36 between the peel breaking roller 136 and the upper peel roll 122U into the peel sheet transport 142 which comprises a pair of confronting O-ring belts 172 for receiving the peel sheet 14 therebetween. The belts 172 extend from the peeler 36 over the supply spindle 152 and the heated upper laminating roll 146U. The peel sheet transport 142 further includes an O-ring belt conveyor 174 which receives the peel sheet 14 thereon from between the belts 172 to carry the peel sheet 14 to a location just upstream of the takeup spindle 154. The peel sheet 14 is discharged from the belt conveyor 174 to the nip formed between the idlers 158U–158L through which the web 148 is carried towards the takeup roll 154. The peel sheet 14 is thus captured on the upperside of the web 148 and is transported simultaneously onto the takeup roll 154 for disposal with the discarded web 148.

Figure 38:
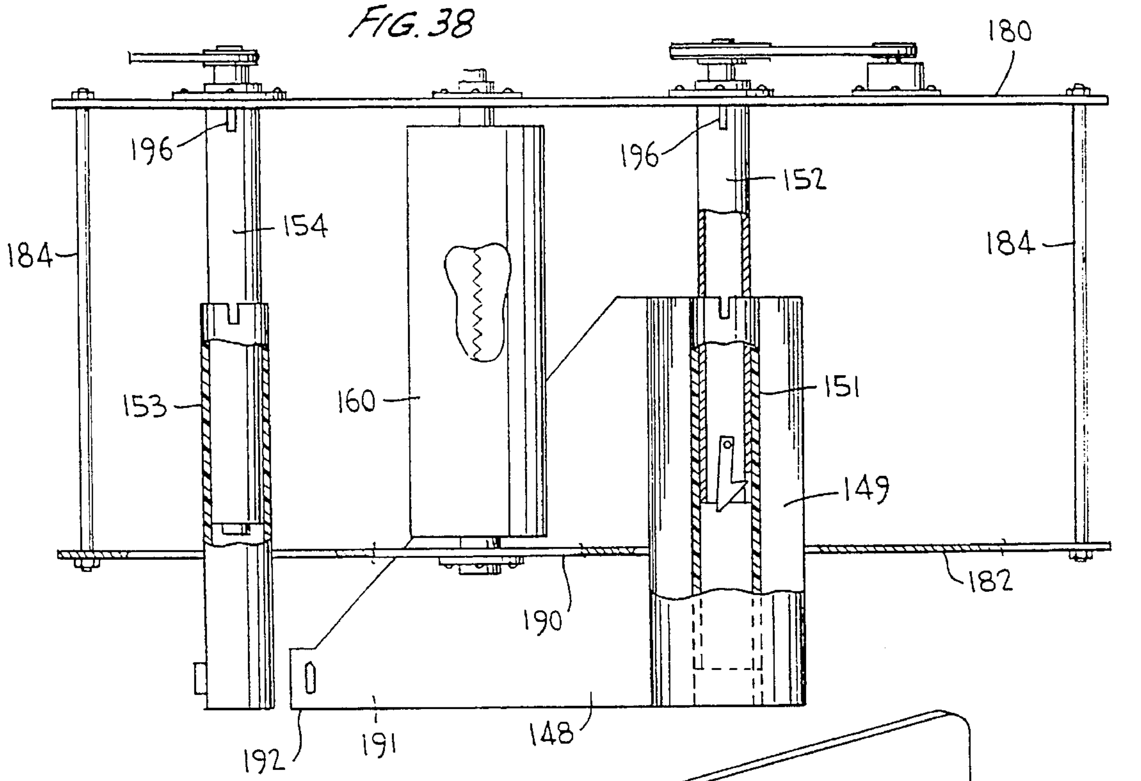
FIGS. 38–39 are respective plan and perspective views of the laminator in the load configuration schematically illustrating various stages of the loading operation.
Figure 39:
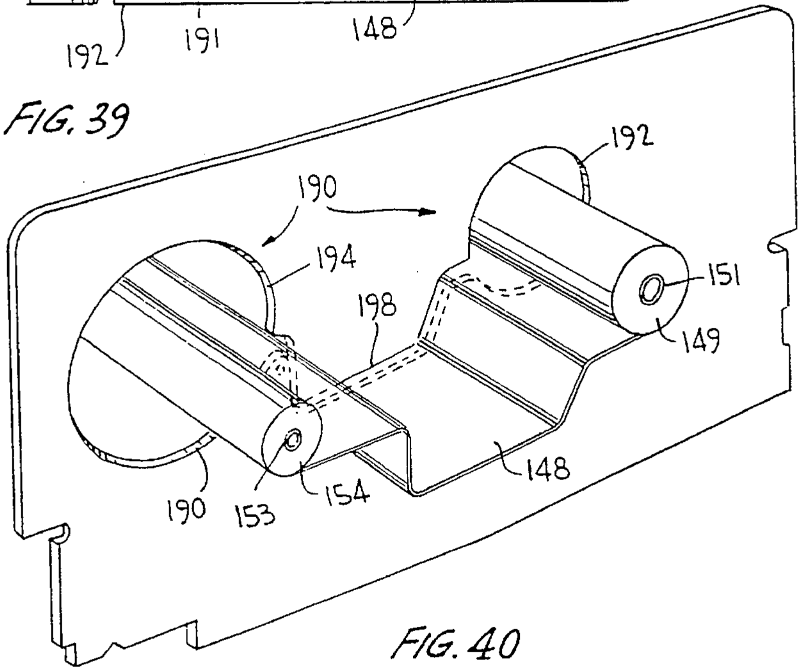

As shown in FIGS. 38 and 39, the laminator 38 is designed for facilitating the loading of the web 148 thereon. The laminator is constructed with a pair of plates 180 and 182 interconnected by a plurality of spacer bars 184. The supply roll 149 is located on motor driven supply spindle 152 mounted on plate 180, the takeup spindle 154 is likewise motor driven and is mounted on plate 180 (FIG. 39). The plate 182 is located on the outboard side of the apparatus and is formed with an aperture 190. The aperture includes a supply aperture 192, a takeup aperture 194 and an interconnected threading slot 198. The supply aperture 192 is concentric with the supply spindle 152 and the takeup aperture 194 is concentric with the takeup spindle 152. The threading slot 198 has a configuration which is generally aligned with the various rollers including driven and idler rollers defining the path for the web 148.

As shown in FIG. 38, the web 148 has a relatively stiff leader 191 which is employed to facilitate threading. In operation, the web 148 is partially loaded onto the supply spindle 152 with the leader 191 unfurled. The leader 191 is threaded through the threading slot 194 and is attached by a tab 192 to the empty core 153 on the takeup spindle 154. The web is then advanced to start the takeup. Once thus secured, the web 148 may be then pushed or urged inboard of the apparatus to a home position established by keyed portions 196 on the spindles 152 and 154 and corresponding key ways on the core portions 151–153, whereupon the film is threaded and ready for lamination process.

Another feature of the present invention is that each of the modules, namely the feeders 32A and 32B, the optical printer 34, the peeler 36 and the laminator 38, as well as the discharge chute or pocket 39 are operatively separated from each next downstream module by a selected operational distance. The operational distance is generally defined as the distance where the film 10 is separated from the function of another module but without regard for film transport. In other words, one module does not operate on a film sheet while another module is operating on the same sheet. By such an expedient, no one module necessarily has control over the film 10 while another module is processing the same sheet of film 10. This arrangement is important to reduce the possibility of jamming and to facilitate removal of defective sheets should jamming occur.

As illustrated in FIG. 18, the separation or operational distance between the feeder 32A or 32B and the printer 34 about one film length L in the transport direction. For example, the distance between the optical printer 34 and the peeler 36 is at least one length L. As a practical expedient, the length of the peeler infeed path 106 is at least one length L. The distance between the peeler 36 and the infeed to the laminator 38 is one length L, as is the distance between the laminator and the discharge pocket 168.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed is:

1. An apparatus for sheetwise dry processing of thermographic print media formed of a thermally printable substrate and an overlying laminated disposable peel sheet joined to the substrate by an intermediate multicomponent adhesive image forming layer being selectively adhesive between the substrate and the peel sheet in response to radiant energy, said substrate has a frangible substrate tab formed in a free surface of the substrate along a score line adjacent the marginal edge of the media comprising:

feeder sheet means for feeding the sheets one at a time from the first position end orientation to a second position wherein the substrate is oriented with the tab at a trailing edge;

print roller means mounted for reversible rotation in infeed and outfeed directions including a wrapping surface for receiving the sheet from the sheet feeder in intimate confronting contact thereabout, said print roller means including adjacent leading and trailing edge clamps for engaging the respective leading and trailing edges of the sheet as received from the sheet feeder means in the infeed direction of rotation to support the sheet on the print roller means for rotation thereon, and for releasing the sheet in the outfeed direction with the tab leading;

thermal printer means cooperating with the print roller means for exposing the image forming layer through the peel sheet as the print roller means rotates to radiant energy so as to produce an image selectively adhered to the substrate;

peeler means for receiving the sheet from the print roller means with the tab at the leading edge, said peeler means engaging the tab from the free surface of the substrate for bending the substrate about the score line causing it to fracture and for pulling the peeler relative to the substrate and the selectively adhered image forming layer for separating the peeler therefrom to thereby produce a peeled image layer formed on the substrate and a waste peeler sheet; and thermal lamination means for receiving the substrate therein with the peeled image layer substrate oriented for thermal laminating engagement with a thermosensitive film having a thermosensitive layer transferrable to the image layer on the substrate for producing a laminated sheet; and, wherein the feeder means, the print roller means, the peeler means and the lamination means are modules each of which separated from each other by an operational distance sufficient so that a sheet of film in a module is functionally separated from of another module and whereby one module does not operate on a film sheet while another module operates on the same film sheet.

2. The apparatus of claim 1 further comprising outfeed roller means for engaging the print roller means with a sheet therebetween in the outfeed direction of rotation.

3. An apparatus for sheetwise dry processing of thermographic print media formed of a thermally printable substrate and an overlying laminated disposable peel sheet joined to the substrate by an intermediate multicomponent adhesive image forming layer being selectively adhesive between the substrate and the peel sheet in response to radiant energy, said substrate has a frangible substrate tab formed in a free surface of the substrate along a score line adjacent the marginal edge of the media comprising:

feeder sheet means for feeding the sheets one at a time from the first position end orientation to a second position wherein the substrate is oriented with the tab at a trailing edge;

print roller means mounted for reversible rotation in infeed and outfeed directions including a wrapping surface for receiving the sheet from the sheet feeder in intimate confronting contact thereabout, said print roller means including adjacent leading and trailing edge clamps for engaging the respective leading and trailing edges of the sheet as received from the sheet feeder means in the infeed direction of rotation to support the sheet on the print roller means for rotation thereon, and for releasing the sheet in the outfeed direction with the tab leading;

thermal printer means cooperating with the print roller means for exposing the image forming layer through the peel sheet as the print roller means rotates to radiant energy so as to produce an image selectively adhered to the substrate;

peeler means for receiving the sheet from the print roller means with the tab at the leading edge, said peeler means engaging the tab from the free surface of the substrate for bending the substrate about the score line causing it to fracture and for pulling the peeler relative to the substrate and the selectively adhered image forming layer for separating the peeler therefrom to thereby produce a peeled image layer formed on the substrate and a waste peeler sheet; and thermal lamination means for receiving the substrate therein with the peeled image layer substrate oriented for thermal laminating engagement with a thermosensitive film having a thermosensitive layer transferrable to the image layer on the substrate for producing a laminated sheet wherein the feeder means feeds the sheet downwardly to the print roller means;

wherein the print roller means outfeeds the sheet upwardly past the feeder means to the peeler means and the laminator means; the laminator means is located above the feeder means and the printer means; and, wherein the laminator means is heated and the position of the laminator facilitates heat dissipation and loading access.

4. The apparatus of claim 3 wherein the print roller means includes anti-skew means for aligning the sheet with the clamp in the infeed direction.

5. The apparatus of claim 4 wherein the anti-skew means includes a pair of driven rollers lying laterally of a center line of the sheet for driving the sheet against the clamp, each roller including a clutch means for releasing the sheet when the leading edge of the corresponding side engages the clamp.

6. The apparatus of claim 1 wherein said sheet feeder means includes a plurality of sheet feeder receptacles which contain the sheets and which are independently operable so that individual sheets can be fed therefrom so that an empty one of said receptacles will not prevent printing of an image in order to reload the empty receptacle.

7. An apparatus for sheetwise dry processing of thermographic print media formed of a thermally printable substrate and an overlying laminated disposable peel sheet joined to the substrate by an intermediate multicomponent adhesive image forming layer being selectively adhesive between the substrate and the peel sheet in response to radiant energy, said substrate has a frangible substrate tab formed in a free surface of the substrate along a score line adjacent the marginal edge of the media comprising:

feeder sheet means for feeding the sheets one at a time from the first position end orientation to a second position wherein the substrate is oriented with the tab at a trailing edge;

print roller means mounted for reversible rotation in infeed and outfeed directions including a wrapping surface for receiving the sheet from the sheet feeder in intimate confronting contact thereabout, said print roller means including adjacent leading and trailing edge clamps for engaging the respective leading and trailing edges of the sheet as received from the sheet feeder means in the infeed direction of rotation to support the sheet on the print roller means for rotation thereon, and for releasing the sheet in the outfeed direction with the tab leading;

anti-skew means for aligning the sheet with the clamp in the infeed direction;

thermal printer means cooperating with the print roller means for exposing the image forming layer through the peel sheet as the print roller means rotates to radiant energy so as to produce an image selectively adhered to the substrate;

peeler means for receiving the sheet from the print roller means with the tab at the leading edge, said peeler means engaging the tab from the free surface of the substrate for bending the substrate about the score line causing it to fracture and for pulling the peeler relative to the substrate and the selectively adhered image forming layer for separating the peeler therefrom to thereby produce a peeled image layer formed on the substrate and a waste peeler sheet; and thermal lamination means for receiving the substrate therein with the peeled image layer substrate oriented for thermal laminating engagement with a thermosensitive film having a thermosensitive layer transferrable to the image layer on the substrate for producing a laminated sheet; and, wherein the feeder means, the print roller means, the peeler means and the lamination means comprise modules each separated by an operational distance sufficient so that a sheet of film in a module is functionally separated from of another module and whereby one module does not operate on a film sheet while another module operates on the same film sheet.

8. The apparatus of claim 7 wherein the anti-skew means includes a pair of driven rollers lying laterally of a center line of the sheet for driving the sheet against the clamp, each roller including a clutch means for releasing the sheet when the leading edge of the corresponding side engages the clamp.

9. The apparatus of claim 7 further comprising outfeed roller means for engaging the print roller means with a sheet therebetween in the outfeed direction of rotation.

* * * * *